Figure 1A:
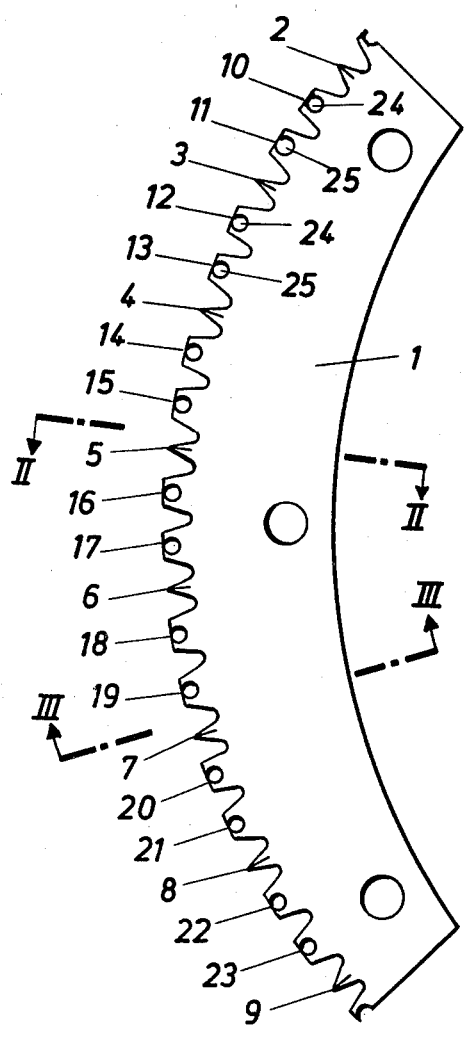

United States Patent [19]
Willinger

[11] 4,283,819
[45] Aug. 18, 1981

[54] SEGMENT-SHAPED BLADE

[75] Inventor: Karl Willinger, Vienna, Austria

[73] Assignee: Miba Sintermetall Aktiengesellschaft, Laakirchen, Austria

[21] Appl. No.: 94,068

[22] Filed: Nov. 14, 1979

[51] Int. Cl.³ .............................................. B23D 71/00
[52] U.S. Cl. .................................. 29/79; 76/101 SM
[58] Field of Search ................ 29/78, 79; 76/101 SM; 157/13

[56] References Cited

U.S. PATENT DOCUMENTS

| 2,896,309 | 7/1959 | Jensen | 29/79 |
| 2,975,504 | 3/1961 | Beutham | 29/78 |
| 3,102,325 | 9/1963 | Hemmeter | 29/79 |
| 3,351,997 | 11/1967 | Neilsen | 29/79 |
| 3,680,185 | 8/1972 | Wood | 29/79 |
| 4,059,875 | 11/1977 | Jensen | 29/78 |
| 4,091,516 | 5/1978 | Jensen et al. | 29/79 |

FOREIGN PATENT DOCUMENTS 1300102 12/1972 United Kingdom .................. 29/78

*Primary Examiner*—Harrison L. Hinson
*Attorney, Agent, or Firm*—Kurt Kelman

[57] ABSTRACT

A segment-shaped blade is provided for use in a rotatable cylindrical tool for machining elastic material, particularly pneumatic rubber tires for vehicles. The blade comprises teeth defined at the convex periphery by approximately V-shaped or circular or oval cuts. Said teeth include one or more triangular teeth and one or more trapezoidal teeth, which precede said triangular teeth in the direction of rotation of the tool and have prongs that are directed toward each other and are bent to different sides out of the plane of the blade. The triangular tooth or teeth are divided by one or more radial cuts into two or more triangular teeth, the prongs of which are bent to different sides out of the plane of the blade. The trapezoidal teeth have preferably legs of equal length. The two prongs of a trapezoidal tooth which are directed toward each other are defined in known manner by a punched circular hole, which is symmetrical to the periphery of the tooth. The two outer edges of the tooth which adjoin the prongs are straight and tangential to the punched hole.

8 Claims, 6 Drawing Figures

U.S. Patent    Aug. 18, 1981    Sheet 1 of 2    4,283,819

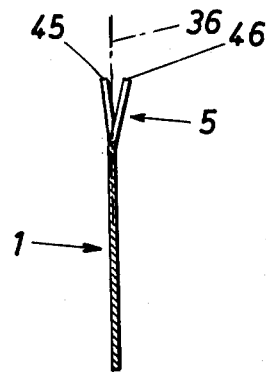
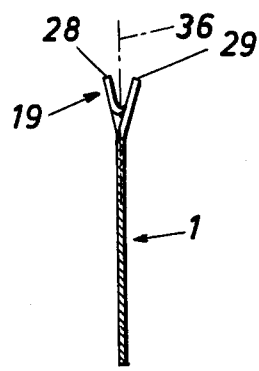
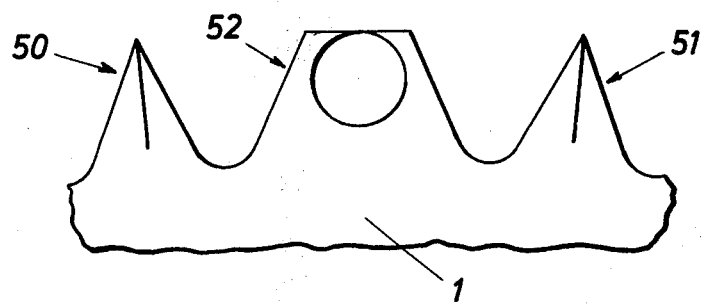
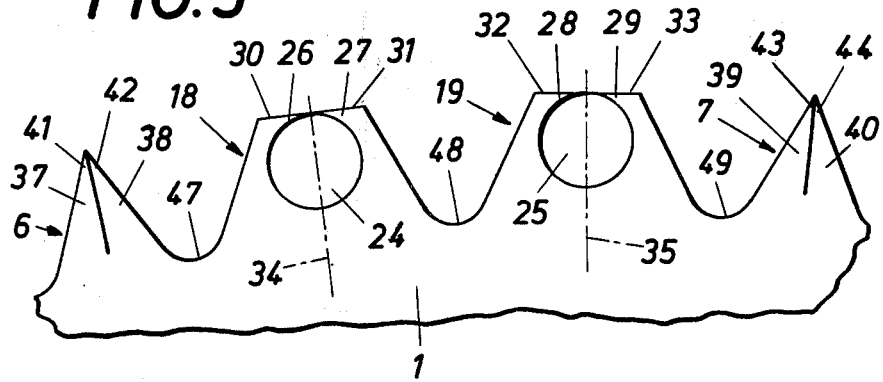

SEGMENT-SHAPED BLADE

This invention relates to a segment-shaped blade for use in a rotatable cylindrical tool for machining elastic material, particularly pneumatic rubber tires for vehicles, comprising teeth defined at the blade periphery by approximately V-shaped or circular or oval cutouts, which teeth include one or more triangular teeth and one or more trapezoidal teeth which precede said triangular teeth in the direction of rotation of the tool and have prongs that are directed toward each other and are bent to different sides out of the plane of the blade.

FIGS. 22, 23 of U.S. Pat. No. 3,879,825 show a rasp blade having teeth which include a polishing triangular tooth which precedes a trapezoidal tooth that has a cutting edge which is inclined in the direction of rotation of the tool. The other edge of the trapezium is radial. A short recess having the configuration of three quadrants is provided at the outer edge of the trapezoidal tooth and defines prongs which serve also to cut the rubber material. With that design, the blade cannot be turned round. Besides, the triangular tooth can produce only a restricted polishing action. For this reason, an additional polishing edge had to be provided in the trapezoidal tooth by a slit therein. Owing to the irregular tooth shapes, the slits and punched holes of such blade, the manufacture thereof involves a high expenditure of work.

U.S. Pat. No. 2,975,504 discloses blades which have outer edges formed with triangular serrations which at their pointed tips are divided by radial cuts so that M-shaped teeth are formed. These can be used for a rough machining of the rubber material but cannot be used to finish or smoothen the same.

It is an object of the invention so to design a blade as described first hereinbefore that its manufacture is simplified and the roughened pattern on the machined surface of the rubber tire is finer than that obtained with known blades. Besides, the blade according to the invention is usable in both directions and has a longer life than the blade known from U.S. Pat. No. 3,879,825.

In accordance with the invention, these objects are accomplished in that the triangular tooth or teeth are divided by one or more radial cuts into two or more triangular prongs bent to different sides out of the plane of the blade, the trapezoidal teeth have two prongs directed toward each other and defined in known manner by a punched circular hole which is symmetrical to the periphery of the tooth. The outer edges of the prongs are straight and tangential to the punched hole. As a result of the combination of trapezoidal teeth for a rough machining and of divided triangular teeth which serve only for a fine roughening of the pneumatic rubber tire on the surface to be machined, the tire surface which has thus been machined is relatively smooth so that it is excellently suited for the succeeding vulcanization. On the other hand, the two kinds of teeth provided on the blade are simple in shape so that such blades can be manufactured in a simple manner with only a few simple punching tools.

Finally, the sharp prongs used for the coarse roughening can be made by a simple punching operation in the manufacture of the blade and when the blade is in use its straight outer edges ensure that only the prongs disposed at the ends of the edges enter the rubber material, which is not entered by the intervening edge portion. In this way, the operating temperature can be kept down and the life of the blade can be increased.

In a preferred embodiment of the invention, the diameter of the punched hole is about ¾ of the height of the tooth and the depth of the cuts in the triangular teeth is also about ¾ of the height of the tooth. This design results in tooth prongs which are particularly strong and stable.

Also in a preferred embodiment of the invention, a V-shaped recess having the configuration of an equilateral triangle is provided between a trapezoidal tooth and a triangular tooth and that portion of said recess which is directed toward the blade is rounded and, if desired, formed by punching. Finally, in a preferred embodiment of the invention the base length of the triangular tooth is about one-half the base length of the trapezoidal tooth. With that design, the portions of the divided triangular tooth are particularly slender so that a still finer and smoother roughened pattern can be obtained on the machined surface of the tyre.

Figure 1B:
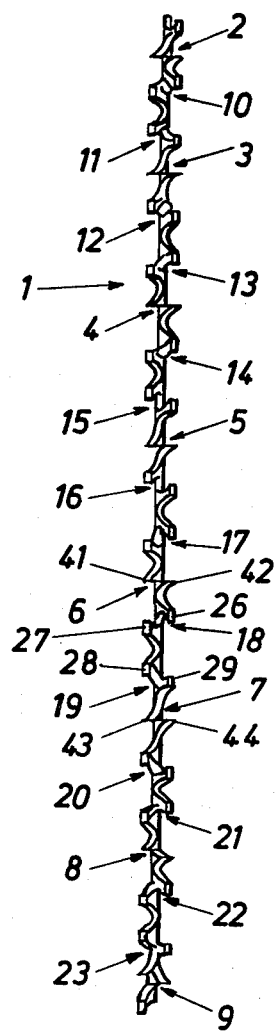

Two embodiments of the invention are shown by way of example on the accompanying drawings, in which FIGS. 1a and 1b are, respectively, a side elevation and a top plan view showing the blade according to the invention, FIGS. 2 and 3 are sectional views taken on lines II—II and III—III, respectively, in FIG. 1, and FIGS. 4 and 5 are greatly enlarged fragmentary views showing blades embodying the invention and having different tooth arrangements.

The blade 1 embodying the invention which is shown in FIGS. 1 to 3 has triangular teeth 2 to 9 and intervening pairs of trapezoidal teeth 10 to 23 which, as shown in FIG. 5, have punched circular holes 24, 25 defining prongs 26, 27 and 28, 29 directed toward each other. These prongs have pointed tips because outer edges 30 to 33 of the teeth extend tangentially to the circular holes. The outer edges 30 to 33 are straight and at right angles to the radial plane of symmetry 34, 35 of each tooth.

As is shown in FIG. 3, the prongs 26, 27 and 28, 29 are bent out of the plane 36 of the blade to different sides.

Each of the triangular teeth 2 to 9 is divided by a radial cut into two tooth portions. Of these tooth portions, only the tooth portions 37 to 40 of the triangular teeth 6 and 7 which precede and succeed the trapezoidal teeth 18, 19 are visible in FIG. 5.

The prongs 41 to 44 of all triangular teeth 2 to 9 are bent out to different sides of the plane 36 of the blade. The bent out prongs 45, 46 of the triangular tooth 5 are shown in FIG. 2.

The above-mentioned radial cuts in the teeth 2 to 9 and the punched circular holes 24, 25 of the teeth 10 to 23 extend generally from the pointed tip or edge of the tooth into the depth of the tooth over about ¾ of the height of the tooth.

The downwardly directed portions of the approximately V-shaped recesses 47 to 49 between adjacent teeth 2 to 23 may be rounded so that punching tools may be used also at said portions in the manufacture of the segment-shaped blade.

Within the scope of the invention, the embodiment shown in FIG. 5 may be modified in that there is only one trapezoidal tooth 52 between two triangular teeth 50, 51, as is shown in FIG. 4.

The selection of the blade of FIG. 5 or of the blade of FIG. 4 will depend on the material to be machined and on the requirement for a less smooth or a particularly smooth roughened pattern on the surface of a pneumatic rubber tire. Trapezoidal teeth larger in number than the triangular teeth of the same blade will ensure a rapid and thorough removal of rubber material whereas the associated divided triangular teeth will leave a roughened pattern which is sufficiently fine to ensure a satisfactory vulcanization of the material to be applied.

On the other hand, blades having divided triangular teeth and trapezoidal teeth equal in number will be used when a particularly smooth and fine roughened pattern is desired on the machined surface of a pneumatic rubber tire.

The invention is not restricted to the embodiments shown by way of example. The configuration and sequence of the teeth shown can be varied as desired with the object of ensuring a finer roughened pattern and to reduce the operating temperature compared to the known blades so that a long life of the blades is ensured.

The embodiments of the invention in which an exclusive property or privilege is claimed are defined as follows:

1. A segment-shaped blade for use in a cylindrical tool for machining elastic material by rotating the tool in a direction of rotation, the blade extending in a plane and having a convex periphery, which comprises a plurality of trapezoidal teeth arranged along the periphery between substantially V-shaped peripheral recesses defining the height of the teeth, each trapezoidal tooth having a radial plane of symmetry and defining a circular hole whose center lies in the plane of symmetry, and each trapezoidal tooth including two prongs bent to different sides of the plane of the blade, each prong extending between the circular hole and an adjacent one of the peripheral recesses and having a straight outer edge tangential to the circular hole and perpendicular to the plane of symmetry.

2. The segment-shaped blade of claim 1, wherein the diameter of the circular hole is about three fourth of the height of the trapezoidal tooth.

3. The segment-shaped blade of claim 1 or 2, wherein each V-shaped recess has the configuration of an equilateral triangle and has a rounded bottom.

4. The segment-shaped blade of claim 1, further comprising a plurality of triangular teeth arranged along the periphery between selected ones of the V-shaped recesses defining the height of the triangular teeth, each triangular tooth being divided by a symmetrically extending radial cut into two prongs bent to different sides of the plane of the blade.

5. The segment-shaped blade of claim 4, wherein the radial cut has a length which is about three fourth of the height of the triangular tooth.

6. The segment-shaped bladeof claim 4, wherein the triangular teeth have a base whose length is about one half the length of the base of the trapezoidal teeth.

7. The segment-shaped blade of claim 4, wherein the trapezoidal and triangular teeth alternate along the periphery.

8. The segment-shaped blade of claim 4, wherein at least two trapezoidal teeth are arranged along the periphery between successive ones of the triangular teeth.

* * * * *